(12) United States Patent
Gao et al.

(10) Patent No.: US 11,229,039 B2
(45) Date of Patent: Jan. 18, 2022

(54) SCHEDULING REQUEST TRANSMISSION METHOD AND RELATED DEVICE

(71) Applicant: China Academy of Telecommunications Technology, Beijing (CN)

(72) Inventors: Xuejuan Gao, Beijing (CN); Xueming Pan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 97 days.

(21) Appl. No.: 16/481,054

(22) PCT Filed: Feb. 9, 2018

(86) PCT No.: PCT/CN2018/076018
§ 371 (c)(1),
(2) Date: Jul. 25, 2019

(87) PCT Pub. No.: WO2018/137718
PCT Pub. Date: Aug. 2, 2018

(65) Prior Publication Data
US 2020/0029348 A1      Jan. 23, 2020

(30) Foreign Application Priority Data

Jan. 25, 2017 (CN) .......................... 201710061320.1

(51) Int. Cl.
*H04W 72/12* (2009.01)
*H04W 16/14* (2009.01)
*H04W 72/04* (2009.01)

(52) U.S. Cl.
CPC ....... *H04W 72/1268* (2013.01); *H04W 16/14* (2013.01); *H04W 72/0446* (2013.01); *H04W 72/1257* (2013.01)

(58) Field of Classification Search
CPC .... H04L 1/00; H04W 72/0446; H04W 16/14; H04W 72/1284; H04W 72/1268; H04W 72/1257
See application file for complete search history.

(56) References Cited

U.S. PATENT DOCUMENTS

2010/0040033 A1    2/2010  Xhafa et al.
2018/0035329 A1*   2/2018  Futaki ............... H04W 72/0446
(Continued)

FOREIGN PATENT DOCUMENTS

CN         104468030 A       3/2015
WO      WO2016060754 A1      4/2016
(Continued)

OTHER PUBLICATIONS

Panasonic, "UL simultaneous transmission between sTTI and TTI," 3GPP TSG-RAN WG1 Meeting #86bis, R1-1609574, Lisbon, Portugal, Oct. 10-14, 2016.
(Continued)

*Primary Examiner* — Syed Ali
(74) *Attorney, Agent, or Firm* — Foley & Lardner LLP

(57) ABSTRACT

A scheduling request transmission method and a related device, used to solve the technical problem wherein no technical solution is currently available for providing SR feedback for terminals supporting different transmission time intervals. The method comprises: a terminal acquiring a first physical uplink control channel (PUCCH) resource corresponding to a first SR and a second PUCCH resource corresponding to a second SR, the first PUCCH resource being different from the second PUCCH resource; the first SR corresponding to a first transmission time interval (TTI) length, and the second SR corresponding to a second TTI length, the first TTI length being different from the second TTI length; the terminal determining whether the first SR and/or the second SR require transmission; if the first SR
(Continued)

and/or the second SR require transmission, the terminal transmitting the first SR and/or the second SR by means of a PUCCH.

16 Claims, 4 Drawing Sheets

(56) References Cited

U.S. PATENT DOCUMENTS

| | | |
|---|---|---|
| 2018/0049227 A1 | 2/2018 | Moon et al. |
| 2018/0077719 A1* | 3/2018 | Nory ................ H04W 28/0278 |
| 2018/0176938 A1* | 6/2018 | Shao .................... H04W 52/346 |
| 2018/0220438 A1* | 8/2018 | Liu ...................... H04W 72/042 |
| 2018/0242347 A1* | 8/2018 | Sahlin ............... H04W 72/0446 |
| 2018/0262307 A1* | 9/2018 | Shimezawa ........... H04L 5/0064 |
| 2018/0359068 A1* | 12/2018 | Kim ...................... H04W 72/14 |
| 2018/0375614 A1* | 12/2018 | Shimezawa ........... H04L 1/0063 |
| 2019/0174440 A1* | 6/2019 | Kwak .................... H04L 25/00 |
| 2019/0174493 A1* | 6/2019 | Horiuchi ............... H04W 52/34 |
| 2019/0174516 A1* | 6/2019 | Shimezawa ....... H04W 72/1263 |
| 2019/0222402 A1* | 7/2019 | Yang ..................... H04W 72/14 |
| 2019/0313436 A1* | 10/2019 | Lee ...................... H04W 72/042 |
| 2020/0036501 A1* | 1/2020 | Gao .................. H04W 72/0493 |
| 2020/0112862 A1* | 4/2020 | Lee ........................ H04L 5/0053 |
| 2020/0120700 A1* | 4/2020 | Shao ...................... H04L 5/0082 |
| 2021/0021454 A1* | 1/2021 | Horiuchi ............. H04W 52/346 |
| 2021/0167890 A1* | 6/2021 | Lee ................... H04W 72/1278 |

FOREIGN PATENT DOCUMENTS

| | | |
|---|---|---|
| WO | WO2016177162 A1 | 11/2016 |
| WO | WO2017171615 A1 | 10/2017 |
| WO | WO2017172447 A1 | 10/2017 |

OTHER PUBLICATIONS

Huawei, HiSilicon, "Handling collision between PUCCH and sPUCCH," 3GPP TSG-RAN WG1 Meeting #87, R1-1611164, Reno, USA, Nov. 14-18, 2016.

Ericsson, "sPUCCH resource management," 3GPP TSG-RAN WG1 Meeting #87, R1-1611518, Reno, USA, Nov. 14-18, 2016.

Catt, "MAC Impact of Short TTI," 3GPP TSG-RAN WG2 Meeting #96, R2-167965, Reno, USA, Nov. 14-18, 2016.

\* cited by examiner

SCHEDULING REQUEST TRANSMISSION METHOD AND RELATED DEVICE

This application is a National Stage of International Application No. PCT/CN2018/076018, filed Feb. 9, 2018, which claims priority to Chinese Patent Application No. 201710061320.1, filed Jan. 25, 2017, both of which are hereby incorporated by reference in their entireties.

FIELD

The present invention relates to the field of communications, and particularly to a method and device for transmitting a scheduling request.

BACKGROUND

In a Long Term Evolution (LTE) system, the periodicity of a Scheduling Request (SR) is defined in sub-frames, and the shortest transmission periodicity of an SR is one sub-frame, where each SR is transmitted in one sub-frame, that is, a Transmission Time Interval (TTI) is one millisecond (ms), and the SR is only a scheduling request for a Physical Uplink Shared Channel (PUSCH) transmitted in 1 ms.

In a system with a shorter delay, a shorter TTI than a sub-frame can be defined for uplink transmission, that is, PUSCH transmission in a TTI of 1 ms or shorter can be supported, so a terminal shall feed back an SR as a scheduling request for a PUSCH in a TTI with a varying length, and the transmission periodicity of the SR may also be shorter than 1 ms to thereby support quicker SR feedback.

Accordingly, the SR feedback mechanism in the legacy system may not be applicable any longer, but there has been absent so far a technical solution to SR feedback by a terminal supporting different transmission time intervals.

SUMMARY

Embodiments of the invention provide a method and device for transmitting an SR so as to address the technical problem in the prior art that there has been absent so far a technical solution to SR feedback by a terminal supporting different transmission time intervals.

Particular technical solutions according to the embodiments of the invention are as follows.

In a first aspect, an embodiment of the invention provides a method for transmitting an SR, the method including:

obtaining, by a terminal, a first PUCCH resource corresponding to a first SR, and a second PUCCH resource corresponding to a second SR, wherein the first PUCCH resource is different from the second PUCCH resource; and the first SR corresponds to a first TTI length, the second SR corresponds to a second TTI length, and the first TTI length is different from the second TTI length;

deciding, by the terminal, whether to transmit the first SR and/or the second SR; and if the first SR and/or the second SR is to be transmitted, then transmitting, by the terminal, the first SR and/or the second SR in a PUCCH.

In a possible implementation, the first SR corresponds to a first uplink shared channel or a first service transmitted using the first TTI length, and the second SR corresponds to a second uplink shared channel or a second service transmitted using the second TTI length; or the first SR corresponds to a first service, the second SR corresponds to a second service, and service attributes of the first service and the second service are different; or a transmission periodicity and/or an offset of the first SR is configured based upon the first TTI length, and a transmission periodicity and/or an offset of the second SR is configured based upon the second TTI length.

In a possible implementation, the second TTI length is less than the first TTI length.

In a possible implementation, if the first SR or the second SR is to be transmitted, then transmitting, by the terminal, the first SR and/or the second SR in a PUCCH includes:

transmitting, by the terminal, the first SR on the first PUCCH resource; or transmitting, by the terminal, the second SR on the second PUCCH resource.

In a possible implementation, if the first SR and the second SR are to be transmitted, then transmitting, by the terminal, the first SR and/or the second SR in a PUCCH includes:

determining, by the terminal, an SR to be transmitted, from the first SR and the second SR;

if the SR to be transmitted is the first SR, then transmitting, by the terminal, the first SR on the first PUCCH resource; or if the SR to be transmitted is the second SR, then transmitting, by the terminal, the second SR on the second PUCCH resource.

In a possible implementation, if the first SR and the second SR are to be transmitted, then transmitting, by the terminal, the first SR and/or the second SR in a PUCCH includes:

transmitting, by the terminal, the second SR on the second PUCCH resource.

In a possible implementation, if the first SR and the second SR are to be transmitted, then transmitting, by the terminal, the first SR and/or the second SR in a PUCCH includes:

transmitting, by the terminal, the first SR on the first PUCCH resource; and transmitting, by the terminal, the second SR on the second PUCCH resource.

In a possible implementation, transmitting, by the terminal, the first SR and/or the second SR in a PUCCH includes:

transmitting, by the terminal, the first SR in a PUCCH corresponding to the second TTI length, and transmitting the second SR in a PUCCH corresponding to the second TTI length; or transmitting, by the terminal, the first SR in a PUCCH corresponding to the first TTI length, and transmitting the second SR in a PUCCH corresponding to the second TTI length.

In a possible implementation, transmitting, by the terminal, the first SR in the PUCCH corresponding to the second TTI length includes:

transmitting, by the terminal, the first SR in the PUCCH corresponding to the second TTI length at a predefined or preconfigured time domain position in a transmission occasion of the first SR.

In a possible implementation, deciding, by the terminal, whether to transmit the first SR and/or the second SR includes:

deciding, by the terminal, whether to transmit the first SR in a transmission occasion of the first SR; and/or deciding, by the terminal, whether to transmit the second SR in a transmission occasion of the second SR.

In a second aspect, an embodiment of the invention provides a method for transmitting an SR, the method including:

configuring, by a network-side device, a terminal with a first PUCCH resource corresponding to a first SR, and a second PUCCH resource corresponding to a second SR, wherein the first PUCCH resource is different from the second PUCCH resource; and the first SR corresponds to a first TTI length, the second SR corresponds to a second TTI length, and the first TTI length is different from the second TTI length; and detecting, by the network-side device, whether the first SR and/or the second SR transmitted by the terminal is received.

In a possible implementation, the first SR corresponds to a first uplink shared channel or a first service transmitted using the first TTI length, and the second SR corresponds to a second uplink shared channel or a second service transmitted using the second TTI length; or the first SR corresponds to a first service, the second SR corresponds to a second service, and service attributes of the first service and the second service are different; or a transmission periodicity and/or an offset of the first SR is configured based upon the first TTI length, and a transmission periodicity and/or an offset of the second SR is configured based upon the second TTI length.

In a possible implementation, the second TTI length is less than the first TTI length.

In a possible implementation, detecting, by the network-side device, whether the first SR and/or the second SR transmitted by the terminal is received includes:

detecting, by the network-side device, the first SR on the first PUCCH resource in a transmission occasion of the first SR; and/or detecting, by the network-side device, the second SR on the second PUCCH resource in a transmission occasion of the second SR.

In a third aspect, an embodiment of the invention provides a terminal including:

a first obtaining module configured to obtain a first PUCCH resource corresponding to a first SR, and a second PUCCH resource corresponding to a second SR, wherein the first PUCCH resource is different from the second PUCCH resource; and the first SR corresponds to a first TTI length, the second SR corresponds to a second TTI length, and the first TTI length is different from the second TTI length;

a first deciding module configured to decide whether to transmit the first SR and/or the second SR; and a first transmitting module configured, if the first SR and/or the second SR is to be transmitted, to transmit the first SR and/or the second SR in a PUCCH.

In a fourth aspect, an embodiment of the invention provides a network-side device including:

a first configuring module configured to configure a terminal with a first PUCCH resource corresponding to a first SR, and a second PUCCH resource corresponding to a second SR, wherein the first PUCCH resource is different from the second PUCCH resource; and the first SR corresponds to a first TTI length, the second SR corresponds to a second TTI length, and the first TTI length is different from the second TTI length; and a first detecting module configured to detect whether the first SR and/or the second SR transmitted by the terminal is received.

In a fifth aspect, an embodiment of the invention provides a terminal including a processor, a memory, and a transceiver, wherein the transceiver receives and transmits data under the control of the processor, the memory stores preset programs, and the processor reads and executes the programs in the memory to:

obtain a first PUCCH resource corresponding to a first SR, and a second PUCCH resource corresponding to a second SR, where the first PUCCH resource is different from the second PUCCH resource; and the first SR corresponds to a first TTI length, the second SR corresponds to a second TTI length, and the first TTI length is different from the second TTI length;

decide whether to transmit the first SR and/or the second SR; and if the first SR and/or the second SR is to be transmitted, transmit the first SR and/or the second SR in a PUCCH through the transceiver.

In a possible implementation, the first SR corresponds to a first uplink shared channel or a first service transmitted using the first TTI length, and the second SR corresponds to a second uplink shared channel or a second service transmitted using the second TTI length; or the first SR corresponds to a first service, the second SR corresponds to a second service, and service attributes of the first service and the second service are different; or a transmission periodicity and/or an offset of the first SR is configured based upon the first TTI length, and a transmission periodicity and/or an offset of the second SR is configured based upon the second TTI length.

In a possible implementation, the second TTI length is less than the first TTI length.

In a possible implementation, if the first SR or the second SR is to be transmitted, then the processor is configured to:

instruct the transceiver to transmit the first SR on the first PUCCH resource; or instruct the transceiver to transmit the second SR on the second PUCCH resource.

In a possible implementation, if the first SR and the second SR are to be transmitted, then the processor is configured to:

determine an SR to be transmitted, from the first SR and the second SR;

if the SR to be transmitted is the first SR, instruct the transceiver to transmit the first SR on the first PUCCH resource; or if the SR to be transmitted is the second SR, instruct the transceiver to transmit the second SR on the second PUCCH resource.

In a possible implementation, if the first SR and the second SR are to be transmitted, then the processor is configured to:

instruct the transceiver to transmit the second SR on the second PUCCH resource.

In a possible implementation, if the first SR and the second SR are to be transmitted, then the processor is configured to:

instruct the transceiver to transmit the first SR on the first PUCCH resource; and instruct the transceiver to transmit the second SR on the second PUCCH resource.

In a possible implementation, the processor is configured to:

instruct the transceiver to transmit the first SR in a PUCCH corresponding to the second TTI length, and transmit the second SR in a PUCCH corresponding to the second TTI length; or instruct the transceiver to transmit the first SR in a PUCCH corresponding to the first TTI length, and transmit the second SR in a PUCCH corresponding to the second TTI length.

In a possible implementation, the processor is configured to:

instruct the transceiver to transmit the first SR in the PUCCH corresponding to the second TTI length at a predefined or preconfigured time domain position in a transmission occasion of the first SR.

In a possible implementation, the processor is configured to:

decide whether to transmit the first SR in a transmission occasion of the first SR; and/or decide whether to transmit the second SR in a transmission occasion of the second SR.

In a sixth aspect, an embodiment of the invention provides a network-side device including a processor, a memory, and a transceiver, wherein the transceiver receives and transmits data under the control of the processor, the memory stores preset programs, and the processor reads and executes the programs in the memory to:

configure a terminal with a first PUCCH resource corresponding to a first SR, and a second PUCCH resource corresponding to a second SR, where the first PUCCH resource is different from the second PUCCH resource; and the first SR corresponds to a first TTI length, the second SR corresponds to a second TTI length, and the first TTI length is different from the second TTI length; and detect whether the first SR and/or the second SR transmitted by the terminal is received.

In a possible implementation, the first SR corresponds to a first uplink shared channel or a first service transmitted using the first TTI length, and the second SR corresponds to a second uplink shared channel or a second service transmitted using the second TTI length; or the first SR corresponds to a first service, the second SR corresponds to a second service, and service attributes of the first service and the second service are different; or a transmission periodicity and/or an offset of the first SR is configured based upon the first TTI length, and a transmission periodicity and/or an offset of the second SR is configured based upon the second TTI length.

In a possible implementation, the second TTI length is less than the first TTI length.

In a possible implementation, the processor is configured to:

detect the first SR on the first PUCCH resource in a transmission occasion of the first SR; and/or detect the second SR on the second PUCCH resource in a transmission occasion of the second SR.

In the technical solutions according to the embodiments of the invention, a terminal obtains a first PUCCH resource corresponding to a first SR, and a second PUCCH resource corresponding to a second SR, where the first PUCCH resource is different from the second PUCCH resource; the first SR corresponds to a first TTI length, the second SR corresponds to a second TTI length, and the first TTI length is different from the second TTI length; the terminal decides whether it is need to transmit the first SR and/or the second SR; and if the first SR and/or the second SR need to be transmitted, then the terminal will transmit the first SR and/or the second SR via a PUCCH. There is provided a technical solution to SR feedback by a terminal supporting a plurality of transmission time intervals so as to address the technical problem in the prior art that there has been absent so far a technical solution to SR feedback by a terminal supporting a plurality of transmission time intervals.

DETAILED DESCRIPTION OF THE EMBODIMENTS

In order to make the objects, technical solutions, and advantages of the invention more apparent, the invention will be described below in further details with reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

Figure 1:
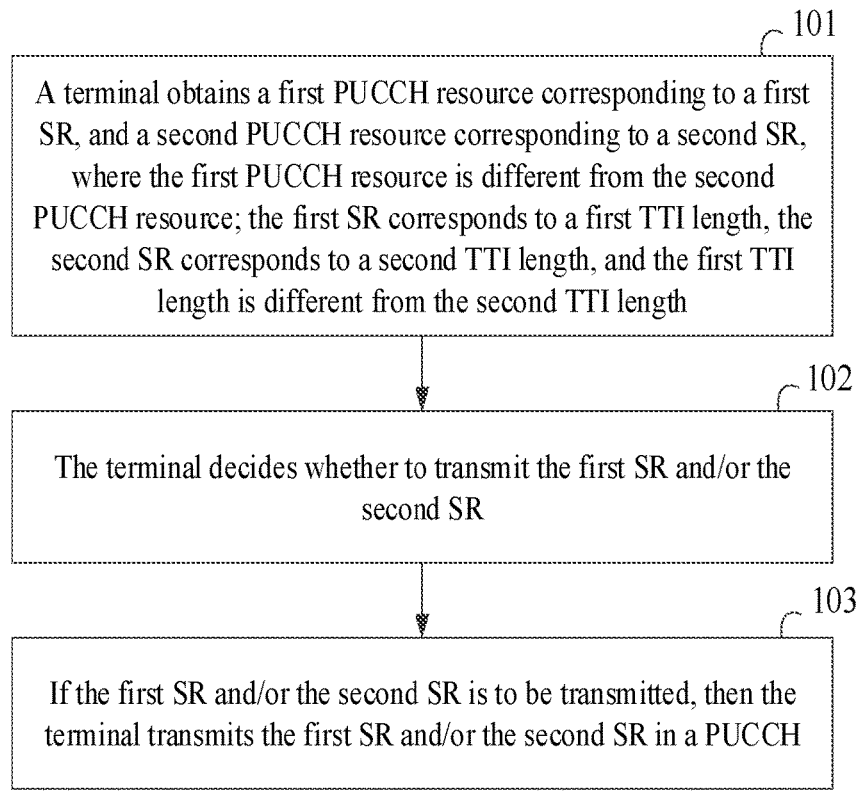
FIG. 1 is a schematic flow chart of a method for transmitting an SR at a terminal side according to an embodiment of the invention.

As illustrated in FIG. 1, a method for transmitting an SR according to an embodiment of the invention includes the following operations.

In the operation 101, a terminal obtains a first PUCCH resource corresponding to a first SR, and a second PUCCH resource corresponding to a second SR, where the first PUCCH resource is different from the second PUCCH resource; the first SR corresponds to a first TTI length, the second SR corresponds to a second TTI length, and the first TTI length is different from the second TTI length.

In the operation 102, the terminal decides whether to transmit the first SR and/or the second SR.

In the operation 103, if the first SR and/or the second SR is to be transmitted, then the terminal transmits the first SR and/or the second SR in a PUCCH.

In the embodiment of the invention, firstly the operation 101 is performed in which the terminal obtains a Physical Uplink Control Channel (PUCCH) resource corresponding to a first SR, and a second PUCCH resource corresponding to a second SR.

In the operation 101, the first SR corresponds to a first uplink shared channel or a first service transmitted using the first TTI length, and the second SR corresponds to a second uplink shared channel or a second service transmitted using the second TTI length; or the first SR corresponds to a first service, the second SR corresponds to a second service, and service attributes of the first service and the second service are different; or a transmission periodicity and/or an offset of the first SR is configured based upon the first TTI length, and a transmission periodicity and/or an offset of the second SR is configured based upon the second TTI length.

In the embodiment of the invention, the first SR corresponds to the first TTI length indicate that: the first SR corresponds to the first uplink shared channel or the first service, and the first uplink shared channel or the first service is transmitted using the corresponding first TTI length; or, the first SR corresponds to the first service attribute(s) including but not limited to a priority, a Quality of Service (QoS), or a delay of the first service; or, a transmission periodicity and/or an offset of the first SR is configured based upon the first TTI length.

Correspondingly, the second SR corresponds to the second TTI length indicate that: the second SR corresponds to the second uplink shared channel or the second service, and the second uplink shared channel or the second service is transmitted using the corresponding second TTI length; or the second SR corresponds to the second service attribute(s) including but not limited to a priority, a QoS, or a delay of the second service; or a transmission periodicity and/or an offset of the second SR is configured based upon the second TTI length.

Here the first service attribute(s) corresponding to the first SR is or are different from the second service attribute(s) corresponding to the second SR.

Furthermore, in the embodiment of the invention, the second TTI length is less than the first TTI length.

In a particular implementation, when the first TTI length is 1 ms, the second TTI length is a TTI length less than 1 ms, e.g., 2, 4, or 7 symbols; and when the first TTI length is a TTI length less than 1 ms, the second TTI length is a TTI length less than 1 ms, for example, the first TTI length is 7 symbols, and the second TTI length is 2 or 4 symbols. In the embodiment of the invention, a symbol can be a Single-Carrier Frequency-Division Multiple Access (SC-FDMA) symbol or an Orthogonal Frequency Division Multiplexing (OFDM) symbol or another symbol, although the embodiment of the invention will not be limited thereto.

After the operation 101 is performed, the operation 102 is performed in which the terminal decides whether to transmit the first SR and/or the second SR.

Figure 2A:
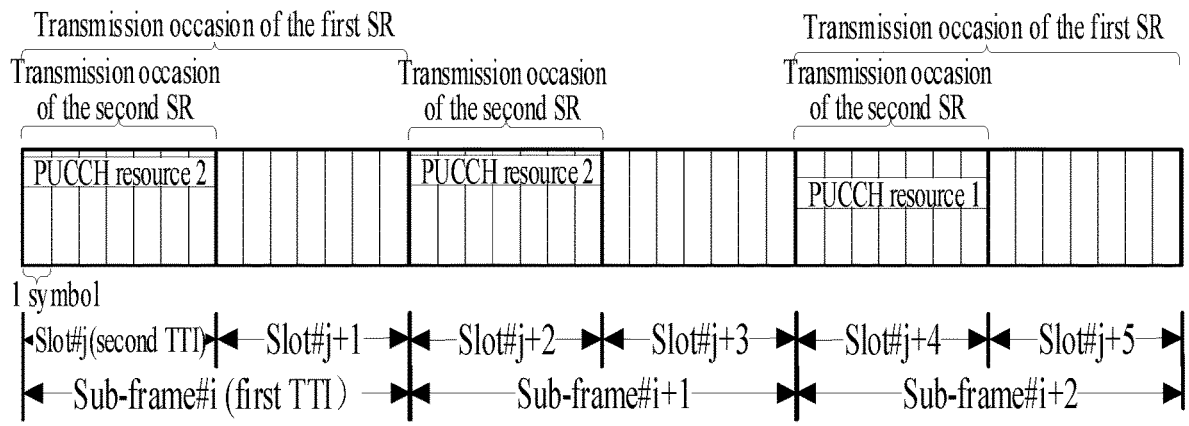
FIG. 2A to FIG. 2C are schematic diagrams of transmission occasions of a first SR and a second SR according to embodiments of the invention.
Figure 2B:
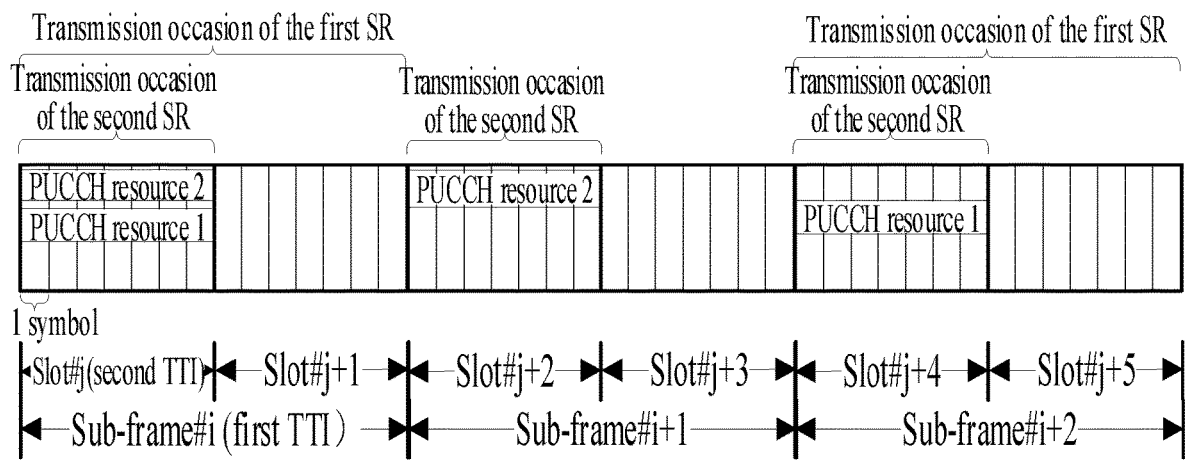
Figure 2C:
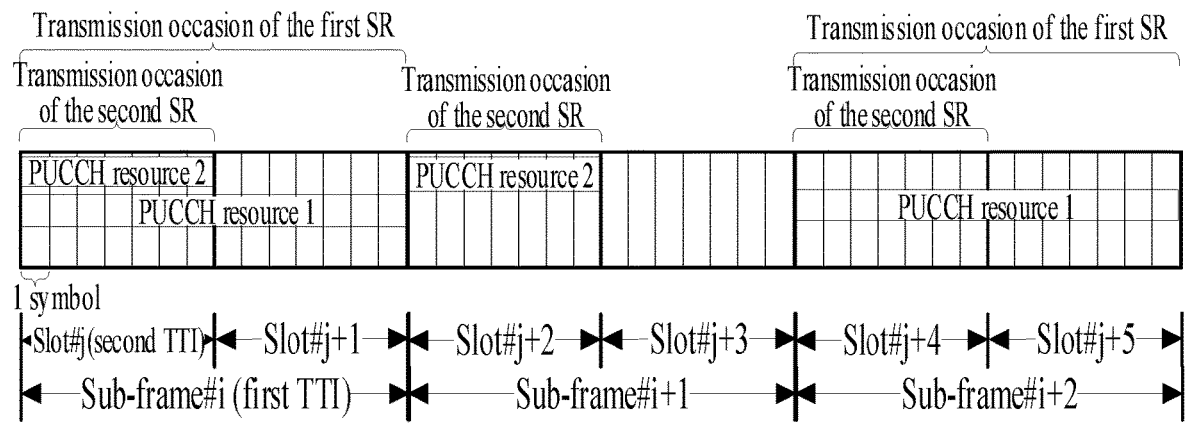

In the embodiment of the invention, by taking the first TTI length as 1 ms, and the second TTI length as 7 symbols (one slot) as an example, the periodicity and the offset of the first SR can be configured in sub-frames to thereby determine transmission occasions of the first SR as illustrated in FIG. 2A to FIG. 2C, that is, sub-frames #i, i+2, i+4, . . . , are transmission sub-frames of the first SR, i.e. the first SR can be transmitted once in every two sub-frames.

The periodicity and the offset of the second SR can be configured in 7 symbols (in slots) to thereby determine transmission occasions of the second SR as illustrated in FIG. 2A to FIG. 2C, that is, slots #j, j+2, j+4, . . . , are transmission slots of the second SR, i.e. the second SR can be transmitted once in each sub-frame, and can be transmitted in the first slot in each sub-frame.

And the first PUCCH resource corresponding to the first SR is preconfigured as a PUCCH resource 1, and the second PUCCH resource corresponding to the second SR is preconfigured as a PUCCH resource 2.

In the embodiment of the invention, there are the following particular implementations of the operation 102 as to be described below respectively, although the embodiment of the invention will not be limited thereto.

First Implementation: the terminal decides whether to transmit the first SR, in a transmission occasion of the first SR.

In a particular implementation, transmission occasions, such as sub-frames #i, i+2, i+4, . . . , of the first SR are determined according to the transmission periodicity and/or the offset of the first SR, and it is determined, in each transmission occasion of the first SR, whether there is a need to transmit the first SR, that is, it is determined whether there is a need to make a scheduling request for the first uplink shared channel or the first service, in each transmission occasion of the first SR, and if so, it will be determined that there is a first SR that needs to be transmitted; otherwise, it will be determined that there is no first SR that needs to be transmitted.

Second Implementation: the terminal decides whether to transmit the second SR, in a transmission occasion of the second SR.

In a particular implementation, transmission occasions, such as the slots #j, j+2, j+4, . . . , of the second SR are determined according to the transmission periodicity and/or the offset of the second SR, and it is determined, in each transmission occasion of the second SR, whether there is a need to transmit the second SR, that is, it is determined whether there is a need to make a scheduling request for the second uplink shared channel or the second service in each transmission occasion of the second SR, and if so, it will be determined that there is a second SR that needs to be transmitted; otherwise, it will be determined that there is no second SR that needs to be transmitted.

In the embodiment of the invention, a transmission occasion of the first SR determined according to the transmission periodicity and/or the offset of the first SR may coincide with a transmission occasion of the second SR determined according to the transmission periodicity and/or the offset of the second SR, e.g., in the slot #j in the sub-frame #i, and in the slot #j+4 in the sub-frame #i+2. In this case, the terminal needs to decide whether to transmit both the first SR and the second SR, that is, whether to make a scheduling request for the first uplink shared channel or the first service, and the second uplink shared channel or the second service, in each overlapping transmission occasion; and if so, the terminal will determine that there are a first SR and a second SR that need to be transmitted; otherwise, the terminal will determine that there are no first SR and second SR that need to be transmitted.

In the embodiment of the invention, after the operation 102 is performed, the operation 103 is performed in which if the first SR and/or the second SR is to be transmitted, then the terminal will transmit the first SR and/or the second SR in a PUCCH.

In the embodiment of the invention, a particular implementation of the operation 103 includes the following operations.

The terminal transmits the first SR in a PUCCH corresponding to the second TTI length, and transmits the second SR in a PUCCH corresponding to the second TTI length; or the terminal transmits the first SR in a PUCCH corresponding to the first TTI length, and transmits the second SR in a PUCCH corresponding to the second TTI length.

In a particular implementation, there are different transmission instances corresponding to the different decisions made by the terminal as to be described below respectively.

First Transmission Instance: the terminal transmits the first SR on the first PUCCH resource.

In the embodiment of the invention, when only the first SR is to be transmitted, the terminal transmits the first SR on the first PUCCH resource. In a particular implementation, the terminal may transmit the first SR in a PUCCH corresponding to the first TTI length on the first PUCCH resource, or may transmit the first SR in a PUCCH corresponding to the second TTI length on the PUCCH resource. This can be selected by those ordinarily skilled in the art as needed in reality, although the embodiment of the invention will not be limited thereto.

Second Transmission Instance: the terminal transmits the second SR on the second PUCCH resource.

In the embodiment of the invention, when only the second SR is to be transmitted, the terminal transmits the second SR on the second PUCCH resource. In a particular implementation, the terminal may transmit the second SR in a PUCCH corresponding to the second TTI length on the PUCCH resource.

Third Transmission Instance: the first SR and the second SR are to be transmitted, and in the embodiment of the invention, when both the first SR and the second SR are to be transmitted, the first SR and the second SR can be transmitted in the following three transmission schemes as to be described below respectively, although the embodiment of the invention will not be limited thereto.

In a first transmission scheme: the terminal determines an SR to be transmitted, from the first SR and the second SR; if the SR to be transmitted is the first SR, then the terminal will transmit the first SR on the first PUCCH resource; and if the SR to be transmitted is the second SR, then the terminal will transmit the second SR on the second PUCCH resource.

In a particular implementation, the terminal selects one of the first SR and the second SR for transmission, according to their service priorities, QoSs, delays, and the like, or randomly selects one of the first SR and the second SR for transmission, and for example, the terminal selects the second SR and aborts the first SR for transmission, so the terminal transmits the second SR in a PUCCH with a TTI length of 7 symbols on the PUCCH resource 2 in the first slot (the slot #j) in the sub-frame #i as illustrated in FIG. 2A; or the terminal selects the first SR and aborts the second SR for transmission, so the terminal transmits the first SR in a PUCCH corresponding to the first TTI length, or a PUCCH corresponding to the second TTI length, on the PUCCH resource 1 in the sub-frame #i+2 as illustrated in FIG. 2C.

In a second transmission scheme: the terminal transmits the second SR on the second PUCCH resource.

In a particular implementation, the terminal always selects the second SR and aborts the first SR for transmission, so the terminal transmits the second SR in a PUCCH with a TTI length of 7 symbols on the PUCCH resource 2 in the first slot (the slot #j) in the sub-frame #i as illustrated in FIG. 2A.

In a third transmission scheme: the terminal transmits the first SR on the first PUCCH resource; and the terminal transmits the second SR on the second PUCCH resource.

In the embodiment of the invention, there are two approaches in the third transmission scheme as to be described below respectively.

In a first approach: in a particular implementation, both the first SR and the second SR are transmitted over PUCCHs corresponding to the second TTI length, and for example, it is predefined that the first SR is transmitted in the first TTI with the second TTI length in the transmission occasion of the first SR, that is, the terminal transmits the first SR in a PUCCH with a TTI length of 7 symbols on the PUCCH resource 1, and transmits the second SR in a PUCCH with a TTI length of 7 symbols on the PUCCH resource 2, in the first slot (the slot #j) in the sub-frame #i as illustrated in FIG. 2B.

In a second approach: the first SR is transmitted in a PUCCH corresponding to the first TTI length, and the second SR is transmitted in a PUCCH corresponding to the second TTI length, so the terminal transmits the first SR in a PUCCH with a TTI length of 1 ms on the PUCCH resource 1 in the sub-frame #i, and transmits the second SR in a PUCCH with a TTI length of 7 symbols on the PUCCH resource 2 in the first slot (the slot #j) in the sub-frame #i as illustrated in FIG. 2C.

Furthermore, in the embodiment of the invention, the terminal transmits the first SR in a PUCCH corresponding to the second TTI length as follows.

The terminal transmits the first SR in a PUCCH corresponding to the second TTI length at a predefined or preconfigured time domain position in the transmission occasion of the first SR.

In a particular implementation, when the first SR is transmitted in a PUCCH corresponding to the second TTI length, the first SR is transmitted in a PUCCH corresponding to the second TTI length at a predefined or preconfigured time domain position in the transmission occasion of the first SR.

Where the length of the PUCCH for transmitting the first SR is predefined or preconfigured, and correspondingly the PUCCH resource 1 is also configured for the PUCCH with the corresponding length.

Figure 3:
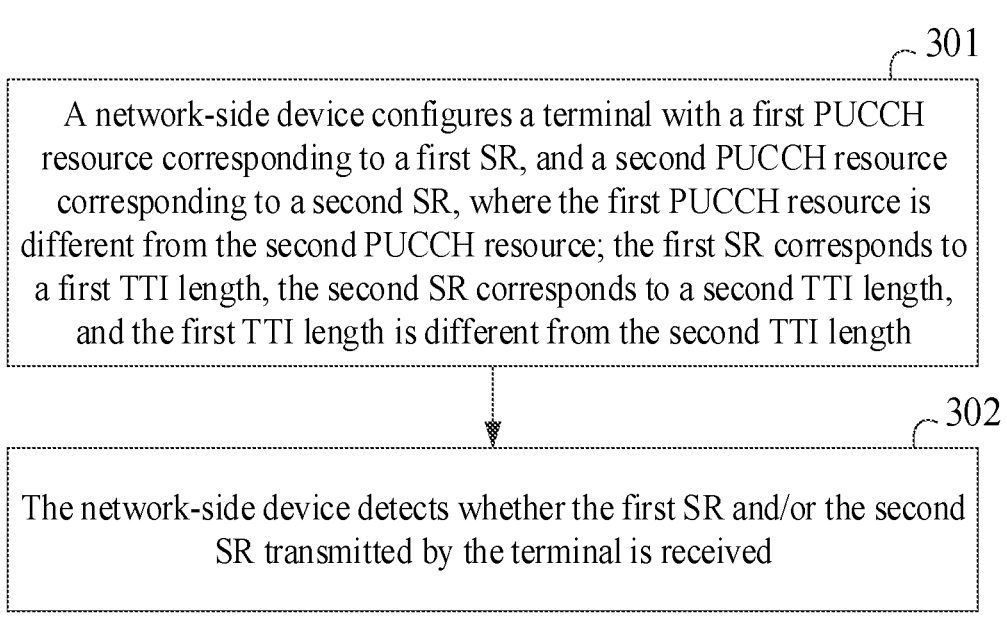
FIG. 3 is a schematic flow chart of a method for transmitting an SR by a network-side device according to an embodiment of the invention.

Based upon the same inventive idea, as illustrated in FIG. 3, a method for transmitting an SR according to an embodiment of the invention includes the following operations.

In the operation 301, a network-side device configures a terminal with a first PUCCH resource corresponding to a first SR, and a second PUCCH resource corresponding to a second SR, where the first PUCCH resource is different from the second PUCCH resource; the first SR corresponds to a first TTI length, the second SR corresponds to a second TTI length, and the first TTI length is different from the second TTI length.

In the operation 302, the network-side device detects whether the first SR and/or the second SR transmitted by the terminal is received.

In the operation 301, the first SR corresponds to a first uplink shared channel or a first service transmitted using the first TTI length, and the second SR corresponds to a second uplink shared channel or a second service transmitted using the second TTI length; or the first SR corresponds to a first service, the second SR corresponds to a second service, and service attributes of the first service and the second service are different; or a transmission periodicity and/or an offset of the first SR is configured based upon the first TTI length, and a transmission periodicity and/or an offset of the second SR is configured based upon the second TTI length.

In the embodiment of the invention, the first SR corresponds to the first TTI length indicate that: the first SR corresponds to the first uplink shared channel or the first service, and the first uplink shared channel or the first service is transmitted using the corresponding first TTI length; or the first SR corresponds to the first service attribute(s) including but not limited to a priority, a QoS, or a delay of the first service; or a transmission periodicity and/or an offset of the first SR is configured based upon the first TTI length.

Correspondingly, the second SR corresponds to the second TTI length indicate that: the second SR corresponds to the second uplink shared channel or the second service, and the second uplink shared channel or the second service is transmitted using the corresponding second TTI length; or the second SR corresponds to the second service attribute(s) including but not limited to a priority, a QoS, or a delay of the second service; or a transmission periodicity and/or an offset of the second SR is configured based upon the second TTI length.

Here the first service attribute(s) corresponding to the first SR is or are different from the second service attribute(s) corresponding to the second SR.

Furthermore, in the embodiment of the invention, the second TTI length is less than the first TTI length.

In a particular implementation, when the first TTI length is 1 ms, the second TTI length is a TTI length less than 1 ms, e.g., 2, 4, or 7 symbols; and when the first TTI length is a TTI length less than 1 ms, the second TTI length is a TTI length less than 1 ms, for example, the first TTI length is 7 symbols, and the second TTI length is 2 or 4 symbols. In the embodiment of the invention, a symbol can be a Single-Carrier Frequency-Division Multiple Access (SC-FDMA) symbol or an Orthogonal Frequency Division Multiplexing (OFDM) symbol or another symbol, although the embodiment of the invention will not be limited thereto.

Furthermore, in the embodiment of the invention, the second TTI length is less than the first TTI length.

In a particular implementation, when the first TTI length is 1 ms, the second TTI length is a TTI length less than 1 ms, e.g., 2, 4, or 7 symbols; and when the first TTI length is a TTI length less than 1 ms, the second TTI length is a TTI length less than 1 ms, for example, the first TTI length is 7 symbols, and the second TTI length is 2 or 4 symbols. In the embodiment of the invention, a symbol can be a Single-Carrier Frequency-Division Multiple Access (SC-FDMA) symbol or an Orthogonal Frequency Division Multiplexing (OFDM) symbol or another symbol, although the embodiment of the invention will not be limited thereto.

After the operation 301 is performed, the operation 302 is performed in which the network-side device detects whether the first SR and/or the second SR transmitted by the terminal is received.

In the embodiment of the invention, there are the following particular implementations of the operation 302 as to be described below respectively, although the embodiment of the invention will not be limited thereto.

First Implementation: the network-side device detects the first SR on the first PUCCH resource in a transmission occasion of the first SR.

In a particular implementation, the network-side device detects the first SR on the first PUCCH resource corresponding to the first SR in a transmission occasion of the first SR.

Second Implementation: the network-side device detects the second SR on the second PUCCH resource in a transmission occasion of the second SR.

In the embodiment of the invention, the network-side device detects the second SR on the PUCCH resource 2 corresponding to the second SR in a transmission occasion of the second SR, e.g., in the first slot (the slot #j+2) in the sub-frame #i+1, which is only the transmission occasion of the second SR; and if the second SR is detected, then the network-side device will determine that the second SR is transmitted by the terminal, and thus schedule an uplink shared channel or service transmission corresponding to the second SR for the terminal; otherwise, the network-side device will determine that the second SR is not transmitted by the terminal.

In the embodiment of the invention, transmission occasions of the first SR and the second SR may coincide, and for example, the first slot (the slot #j) in the sub-frame #i, or the first slot (the slot #j+4) in the sub-frame #i+2 is a transmission occasion of the first SR and the second SR; and since the network-side device does not know whether both the first SR and the second SR, or only one of them, or none of them needs to be transmitted by the terminal at this time, the network-side device shall detect the first SR and the second SR blindly on the PUCCH resources corresponding to the first SR and the second SR in the following three detection instances as to be described below respectively.

A first detection instance corresponds to the first transmission instance in which the terminal transmits the first SR and the second SR.

The network-side device can detect blindly on the PUCCH resources corresponding to the first SR and the second SR, and if an SR is detected on a PUCCH resource corresponding to one of the first SR and the second SR, then the network-side device will determine that the corresponding first or second SR is transmitted by the terminal, and thus schedule uplink shared channel or service transmission corresponding to the corresponding SR for the terminal.

Of course, alternatively the network-side device can firstly detect on the PUCCH resource 2 corresponding to the second SR, and if an SR is detected, then the network-side device will determine that the second SR is transmitted by the terminal, and thus schedule uplink shared channel or service transmission corresponding to the second SR for the terminal; otherwise, the network-side device will determine that the second SR is not transmitted by the terminal. At this time, the network-side device can further detect on the PUCCH resource 1 corresponding to the first SR, and if an SR is detected, then the network-side device will determine that the first SR is transmitted by the terminal, and thus schedule uplink shared channel or service transmission corresponding to the first SR for the terminal; otherwise, the network-side device will determine that the first SR is not transmitted by the terminal.

A second detection instance corresponds to the second transmission instance in which the terminal transmits the first SR and the second SR.

The network-side device can firstly detect on the PUCCH resource 2 corresponding to the second SR, and if an SR is detected, then the network-side device will determine that the second SR is transmitted by the terminal, and thus schedule uplink shared channel or service transmission corresponding to the second SR for the terminal; otherwise, the network-side device will determine that the second SR is not transmitted by the terminal, and may further detect on the PUCCH resource 1 corresponding to the first SR, and if an SR is detected, then the network-side device will determine that the first SR is transmitted by the terminal, and thus schedule uplink shared channel or service transmission corresponding to the first SR for the terminal; otherwise, the network-side device will determine that the first SR is not transmitted by the terminal.

A third detection instance corresponds to the third transmission instance in which the terminal transmits the first SR and the second SR.

The network-side device can detect blindly on the PUCCH resources corresponding to the first SR and the second SR, and if an SR is detected over a resource corresponding to one of the first SR and the second SR, then the network-side device will determine that the corresponding first or second SR is transmitted by the terminal, and thus schedule uplink shared channel or service transmission corresponding to the corresponding SR for the terminal.

In the first to third instances above, the network-side device can detect on the PUCCH resource 1 corresponding to the first SR by detecting in a PUCCH transmitted using the first TTI length, or a PUCCH transmitted using the second TTI length, dependent upon a predefined or preconfigured length of a PUCCH for transmitting the first SR, where the PUCCH resource 1 is also configured correspondingly for the corresponding length of the PUCCH.

In the embodiment of the invention, different SRs are transmitted over different PUCCH resources, and distinguished from each other in TTI lengths according to their transmission resources, so the network-side device can determine a type of service and a demand of service for the terminal according to the received SR or SRs, and then perform reasonable uplink scheduling.

Figure 4:
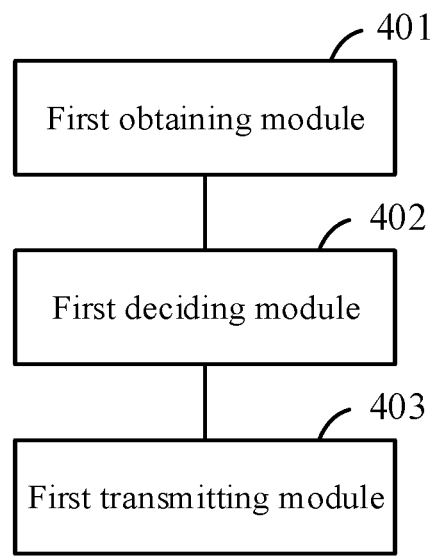
FIG. 4 is a schematic structural diagram of a terminal according to an embodiment of the invention.

Based upon the same inventive idea, an embodiment of the invention provides a terminal, and reference can be made to the description of the method embodiment above for a particular implementation of the terminal, so a repeated description thereof will be omitted here; and as illustrated in FIG. 4, the terminal generally includes: a first obtaining module 401 configured to obtain a first PUCCH resource corresponding to a first SR, and a second PUCCH resource corresponding to a second SR, where the first PUCCH resource is different from the second PUCCH resource, the first SR corresponds to a first TTI length, the second SR corresponds to a second TTI length, and the first TTI length is different from the second TTI length; a first deciding module 402 configured to decide whether to transmit the first SR and/or the second SR; and a first transmitting module 403 configured, if the first SR and/or the second SR is to be transmitted, to transmit the first SR and/or the second SR in a PUCCH.

In a possible implementation, the first SR corresponds to a first uplink shared channel or a first service transmitted using the first TTI length, and the second SR corresponds to a second uplink shared channel or a second service transmitted using the second TTI length; or the first SR corresponds to a first service, the second SR corresponds to a second service, and there are different service attributes of the first service and the second service; or a transmission periodicity and/or an offset of the first SR is configured based upon the first TTI length, and a transmission periodicity and/or an offset of the second SR is configured based upon the second TTI length.

In a possible implementation, the second TTI length is less than the first TTI length.

In a possible implementation, if the first SR or the second SR is to be transmitted, then the first transmitting module 403 is configured to: transmit the first SR on the first PUCCH resource; or transmit the second SR on the second PUCCH resource.

In a possible implementation, if the first SR and the second SR are to be transmitted, then the first transmitting module 403 is configured to: determine an SR to be transmitted, from the first SR and the second SR; if the SR to be transmitted is the first SR, transmit the first SR on the first PUCCH resource; or if the SR to be transmitted is the second SR, transmit the second SR on the second PUCCH resource.

In a possible implementation, if the first SR and the second SR are to be transmitted, then the first transmitting module 403 is configured to transmit the second SR on the second PUCCH resource.

In a possible implementation, if the first SR and the second SR are to be transmitted, then the first transmitting module 403 is configured to: transmit the first SR on the first PUCCH resource; and transmit the second SR on the second PUCCH resource.

In a possible implementation, the first transmitting module 403 is configured to: transmit the first SR in a PUCCH corresponding to the second TTI length, and transmit the second SR in a PUCCH corresponding to the second TTI length; or transmit the first SR in a PUCCH corresponding to the first TTI length, and transmit the second SR in a PUCCH corresponding to the second TTI length.

In a possible implementation, the first transmitting module 403 is configured to: transmit the first SR in the PUCCH corresponding to the second TTI length at a predefined or preconfigured time domain position in a transmission occasion of the first SR.

In a possible implementation, the first determining module 402 is configured to: decide whether to transmit the first SR in a transmission occasion of the first SR; and decide whether to transmit the second SR in a transmission occasion of the second SR.

Figure 5:
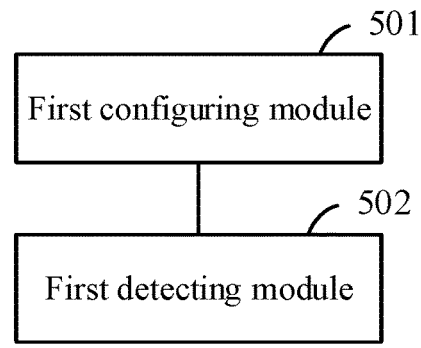
FIG. 5 is a schematic structural diagram of a network-side device according to an embodiment of the invention.

Based upon the same inventive idea, an embodiment of the invention provides a network-side device, and reference can be made to the description of the method embodiment above for a particular implementation of the network-side device, so a repeated description thereof will be omitted here; and as illustrated in FIG. 5, the network-side device generally includes: a first configuring module 501 configured to configure a terminal with a first PUCCH resource corresponding to a first SR, and a second PUCCH resource corresponding to a second SR, where the first PUCCH resource is different from the second PUCCH resource, the first SR corresponds to a first TTI length, the second SR corresponds to a second TTI length, and the first TTI length is different from the second TTI length; and a first detecting module 502 configured to detect whether the first SR and/or the second SR transmitted by the terminal is received.

In a possible implementation, the first SR corresponds to a first uplink shared channel or a first service transmitted using the first TTI length, and the second SR corresponds to a second uplink shared channel or a second service transmitted using the second TTI length; or the first SR corresponds to a first service, the second SR corresponds to a second service, and there are different service attributes of the first service and the second service; or a transmission periodicity and/or an offset of the first SR is configured based upon the first TTI length, and a transmission periodicity and/or an offset of the second SR is configured based upon the second TTI length.

In a possible implementation, the second TTI length is less than the first TTI length.

In a possible implementation, the first detecting module 502 is configured to: detect the first SR on the first PUCCH resource in a transmission occasion of the first SR; and/or detect the second SR on the second PUCCH resource in a transmission occasion of the second SR.

Figure 6:
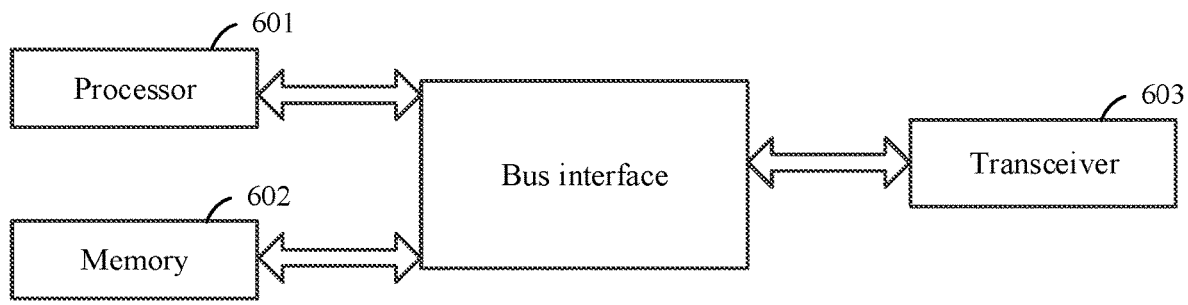
FIG. 6 is a schematic structural diagram of another terminal according to an embodiment of the invention.

Based upon the same inventive idea, an embodiment of the invention provides a terminal, and reference can be made to the description of the method embodiment above for a particular implementation of the terminal, so a repeated description thereof will be omitted here; and as illustrated in FIG. 6, the terminal generally includes a processor 601, a memory 602, and a transceiver 603, where the transceiver 603 receives and transmits data under the control of the processor 601, the memory 602 stores preset programs, and the processor 601 reads and executes the programs in the memory 602 to: obtain a first PUCCH resource corresponding to a first SR, and a second PUCCH resource corresponding to a second SR, where the first PUCCH resource is different from the second PUCCH resource, the first SR corresponds to a first TTI length, the second SR corresponds to a second TTI length, and the first TTI length is different from the second TTI length; decide whether to transmit the first SR and/or the second SR; and if the first SR and/or the second SR is to be transmitted, transmit the first SR and/or the second SR in a PUCCH through the transceiver 603.

In a possible implementation, the first SR corresponds to a first uplink shared channel or a first service transmitted using the first TTI length, and the second SR corresponds to a second uplink shared channel or a second service transmitted using the second TTI length; or the first SR corresponds to a first service, the second SR corresponds to a second service, and there are different service attributes of the first service and the second service; or a transmission periodicity and/or an offset of the first SR is configured based upon the first TTI length, and a transmission periodicity and/or an offset of the second SR is configured based upon the second TTI length.

In a possible implementation, the second TTI length is less than the first TTI length.

In a possible implementation, if the first SR or the second SR is to be transmitted, then the processor 601 is configured to: instruct the transceiver 603 to transmit the first SR on the first PUCCH resource; or instruct the transceiver 603 to transmit the second SR on the second PUCCH resource.

In a possible implementation, if the first SR and the second SR are to be transmitted, then the processor 601 is configured to: determine an SR to be transmitted, from the first SR and the second SR; if the SR to be transmitted is the first SR, instruct the transceiver 603 to transmit the first SR on the first PUCCH resource; or if the SR to be transmitted is the second SR, instruct the transceiver 603 to transmit the second SR on the second PUCCH resource.

In a possible implementation, if the first SR and the second SR are to be transmitted, then the processor 601 is configured to instruct the transceiver 603 to transmit the second SR on the second PUCCH resource.

In a possible implementation, if the first SR and the second SR are to be transmitted, then the processor 601 is configured to: instruct the transceiver 603 to transmit the first SR on the first PUCCH resource; and instruct the transceiver 603 to transmit the second SR on the second PUCCH resource.

In a possible implementation, the processor 601 is configured to: instruct the transceiver 603 to transmit the first SR in a PUCCH corresponding to the second TTI length, and transmit the second SR in a PUCCH corresponding to the second TTI length; or instruct the transceiver 603 to transmit the first SR in a PUCCH corresponding to the first TTI length, and transmit the second SR in a PUCCH corresponding to the second TTI length.

In a possible implementation, the processor 601 is configured to: instruct the transceiver 603 to transmit the first SR in the PUCCH corresponding to the second TTI length at a predefined or preconfigured time domain position in a transmission occasion of the first SR.

In a possible implementation, the processor 601 is configured to: decide whether to transmit the first SR in a transmission occasion of the first SR; and decide whether to transmit the second SR in a transmission occasion of the second SR.

Figure 7:
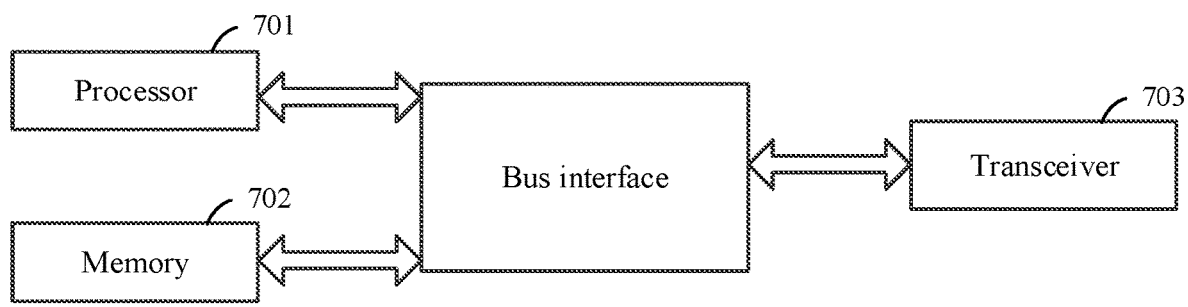
FIG. 7 is a schematic structural diagram of another network-side device according to an embodiment of the invention.

Based upon the same inventive idea, an embodiment of the invention provides a network-side device, and reference can be made to the description of the method embodiment above for a particular implementation of the network-side device, so a repeated description thereof will be omitted here; and as illustrated in FIG. 7, the network-side device generally includes a processor 701, a memory 702, and a transceiver 703, where the transceiver 703 receives and transmits data under the control of the processor 701, the memory 702 stores preset programs, and the processor 701 reads and executes the programs in the memory 702 to: configure a terminal with a first PUCCH resource corresponding to a first SR, and a second PUCCH resource corresponding to a second SR, where the first PUCCH resource is different from the second PUCCH resource, the first SR corresponds to a first TTI length, the second SR corresponds to a second TTI length, and the first TTI length is different from the second TTI length; and detect whether the first SR and/or second SR transmitted by the terminal is received.

In a possible implementation, the first SR corresponds to a first uplink shared channel or a first service transmitted using the first TTI length, and the second SR corresponds to a second uplink shared channel or a second service transmitted using the second TTI length; or the first SR corresponds to a first service, the second SR corresponds to a second service, and there are different service attributes of the first service and the second service; or a transmission periodicity and/or an offset of the first SR is configured based upon the first TTI length, and a transmission periodicity and/or an offset of the second SR is configured based upon the second TTI length.

In a possible implementation, the second TTI length is less than the first TTI length.

In a possible implementation, the processor 701 is configured to: detect the first SR on the first PUCCH resource in a transmission occasion of the first SR; and/or detect the second SR on the second PUCCH resource in a transmission occasion of the second SR.

In the technical solutions above according to the embodiments of the invention, a terminal obtains a first PUCCH resource corresponding to a first SR, and a second PUCCH resource corresponding to a second SR, where the first PUCCH resource is different from the second PUCCH resource; the first SR corresponds to a first TTI length, the second SR corresponds to a second TTI length, and the first TTI length is different from the second TTI length; the terminal decides whether to transmit the first SR and/or the second SR; and if the first SR and/or the second SR is to be transmitted, then the terminal will transmit the first SR and/or the second SR via a PUCCH. There is provided a technical solution to SR feedback by a terminal supporting a plurality of transmission time intervals so as to address the technical problem in the prior art that there has been absent so far a technical solution to SR feedback by a terminal supporting a plurality of transmission time intervals.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting a Scheduling Request (SR), the method comprising:
    obtaining, by a terminal, a first Physical Uplink Control Channel (PUCCH) resource corresponding to a first SR, and a second PUCCH resource corresponding to a second SR, wherein the first PUCCH resource is different from the second PUCCH resource; the first SR corresponds to a first Transmission Time Interval (TTI) length, the second SR corresponds to a second TTI length, and the first TTI length is different from the second TTI length;
    deciding, by the terminal, whether to transmit the first SR and/or the second SR in one or more transmission occasions of the first SR and/or the second SR, wherein the one or more transmission occasions are determined based on a transmission periodicity and/or an offset of a corresponding SR, and the corresponding SR is the first SR or the second SR; and
    transmitting, by the terminal, the first SR and/or the second SR in a PUCCH if the first SR and/or the second SR is to be transmitted;
    wherein when the first SR and the second SR are to be transmitted, transmitting, by the terminal, the first SR and/or the second SR in the PUCCH comprises one of following schemes:
    scheme 1:
    determining, by the terminal, an SR to be transmitted, from the first SR and the second SR;
    transmitting, by the terminal, the first SR on the first PUCCH resource when the SR to be transmitted is the first SR; or
    transmitting, by the terminal, the second SR on the second PUCCH resource when the SR to be transmitted is the second SR;
    scheme 2:
    transmitting, by the terminal, the second SR on the second PUCCH resource; or
    scheme 3:
    transmitting, by the terminal, the first SR on the first PUCCH resource; and
    transmitting, by the terminal, the second SR on the second PUCCH resource;

wherein transmitting, by the terminal, the first SR and/or the second SR in the PUCCH comprises:
    transmitting, by the terminal, the first SR in a PUCCH corresponding to the second TTI length, and transmitting the second SR in a PUCCH corresponding to the second TTI length; or
    transmitting, by the terminal, the first SR in a PUCCH corresponding to the first TTI length, and transmitting the second SR in a PUCCH corresponding to the second TTI length;
    wherein transmitting, by the terminal, the first SR in the PUCCH corresponding to the second TTI length comprises:
    transmitting, by the terminal, the first SR in the PUCCH corresponding to the second TTI length at a predefined or preconfigured time domain position in a transmission occasion of the first SR.

2. The method according to claim 1, wherein the second TTI length is less than the first TTI length.

3. The method according to claim 1, wherein when the first SR or the second SR is to be transmitted, transmitting, by the terminal, the first SR and/or the second SR in the PUCCH comprises:
    transmitting, by the terminal, the first SR on the first PUCCH resource; or
    transmitting, by the terminal, the second SR on the second PUCCH resource.

4. The method according to claim 1, wherein
    the first SR corresponds to a first service transmitted using the first TTI length, and the second SR corresponds to a second service transmitted using the second TTI length; or
    the first SR corresponds to a first service, the second SR corresponds to a second service, and service attributes of the first service and the second service are different; or
    a transmission periodicity and/or an offset of the first SR is configured based upon the first TTI length, and a transmission periodicity and/or an offset of the second SR is configured based upon the second TTI length.

5. A method for transmitting a Scheduling Request (SR), the method comprising:
    configuring, by a network-side device, a terminal with a first Physical Uplink Control Channel (PUCCH) resource corresponding to a first SR, and a second PUCCH resource corresponding to a second SR, wherein the first PUCCH resource is different from the second PUCCH resource; the first SR corresponds to a first Transmission Time Interval (TTI) length, the second SR corresponds to a second TTI length, and the first TTI length is different from the second TTI length; and
    detecting, by the network-side device, whether the first SR and/or the second SR transmitted by the terminal is received in one or more transmission occasions of the first SR and/or the second SR, wherein the one or more transmission occasions are determined based on a transmission periodicity and/or an offset of a corresponding SR, and the corresponding SR is the first SR or the second SR;
    wherein when the first SR and the second SR are to be transmitted by the terminal, detecting, by the network-side device, whether the first SR and the second SR transmitted by the terminal is received comprises one of following schemes:

scheme 1: detecting the first SR on the first PUCCH resource, or detecting the second SR on the second PUCCH resource;

scheme 2: detecting the second SR on the second PUCCH resource; or scheme 3: detecting the first SR on the first PUCCH resource, and detecting the second SR on the second PUCCH resource;

wherein the detecting, by the network-side device, whether the first SR and/or the second SR transmitted by the terminal is received comprises:

detecting the first SR in a PUCCH corresponding to the second TTI length, and detecting the second SR in a PUCCH corresponding to the second TTI length; or detecting the first SR in a PUCCH corresponding to the first TTI length, and detecting the second SR in a PUCCH corresponding to the second TTI length;

wherein the detecting the first SR in the PUCCH corresponding to the second TTI length comprises:

detecting the first SR in the PUCCH corresponding to the second TTI length at a predefined or preconfigured time domain position in a transmission occasion of the first SR.

6. The method according to claim 5, wherein the second TTI length is less than the first TTI length.

7. The method according to claim 5, wherein detecting, by the network-side device, whether the first SR and/or the second SR transmitted by the terminal is received comprises:

detecting, by the network-side device, the first SR on the first PUCCH resource in a transmission occasion of the first SR; and/or detecting, by the network-side device, the second SR on the second PUCCH resource in a transmission occasion of the second SR.

8. The method according to claim 5, wherein
the first SR corresponds to a first service transmitted using the first TTI length, and the second SR corresponds to a second service transmitted using the second TTI length; or the first SR corresponds to a first service, the second SR corresponds to a second service, and service attributes of the first service and the second service are different; or a transmission periodicity and/or an offset of the first SR is configured based upon the first TTI length, and a transmission periodicity and/or an offset of the second SR is configured based upon the second TTI length.

9. A terminal, comprising a processor, a memory, and a transceiver, wherein the transceiver receives and transmits data under the control of the processor, the memory stores preset programs, and the processor reads and executes the programs in the memory to:

obtain a first Physical Uplink Control Channel (PUCCH) resource corresponding to a first Scheduling Request (SR), and a second PUCCH resource corresponding to a second SR, wherein the first PUCCH resource is different from the second PUCCH resource; the first SR corresponds to a first Transmission Time Interval (TTI) length, the second SR corresponds to a second TTI length, and the first TTI length is different from the second TTI length;

decide whether to transmit the first SR and/or the second SR in one or more transmission occasions of the first SR and/or the second SR, wherein the one or more transmission occasions are determined based on a transmission periodicity and/or an offset of a corresponding SR, and the corresponding SR is the first SR or the second SR; and transmit the first SR and/or the second SR in a PUCCH through the transceiver if the first SR and/or the second SR is to be transmitted;

wherein when the first SR and the second SR are to be transmitted, the processor is configured to read and execute the programs in the memory to transmit the first SR and/or the second SR in the PUCCH via one of following schemes:

scheme 1:
determining an SR to be transmitted, from the first SR and the second SR;
transmitting the first SR on the first PUCCH resource when the SR to be transmitted is the first SR; or
transmitting the second SR on the second PUCCH resource when the SR to be transmitted is the second SR;

scheme 2:
transmitting the second SR on the second PUCCH resource; or scheme 3:
transmitting the first SR on the first PUCCH resource; and
transmitting the second SR on the second PUCCH resource;

wherein the processor is further configured to read and execute the programs in the memory to transmit the first SR and/or the second SR in the PUCCH by:
transmitting the first SR in a PUCCH corresponding to the second TTI length, and transmitting the second SR in a PUCCH corresponding to the second TTI length; or
transmitting the first SR in a PUCCH corresponding to the first TTI length, and transmitting the second SR in a PUCCH corresponding to the second TTI length;

wherein the processor is further configured to read and execute the programs in the memory to transmit the first SR in the PUCCH corresponding to the second TTI length by:
transmitting the first SR in the PUCCH corresponding to the second TTI length at a predefined or preconfigured time domain position in a transmission occasion of the first SR.

10. The terminal according to claim 9, wherein the second TTI length is less than the first TTI length.

11. The terminal according to claim 9, wherein when the first SR or the second SR is to be transmitted, the processor is further configured to read and execute the programs in the memory to:
transmit the first SR on the first PUCCH resource; or
transmit the second SR on the second PUCCH resource.

12. The terminal according to claim 9, wherein
the first SR corresponds to a first service transmitted using the first TTI length, and the second SR corresponds to a second service transmitted using the second TTI length; or
the first SR corresponds to a first service, the second SR corresponds to a second service, and service attributes of the first service and the second service are different; or
a transmission periodicity and/or an offset of the first SR is configured based upon the first TTI length, and a transmission periodicity and/or an offset of the second SR is configured based upon the second TTI length.

13. A network-side device, comprising a processor, a memory, and a transceiver, wherein the transceiver receives and transmits data under the control of the processor, the memory stores preset programs, and the processor reads and executes the programs in the memory to:

configure a terminal with a first Physical Uplink Control Channel (PUCCH) resource corresponding to a first Scheduling Request (SR), and a second PUCCH resource corresponding to a second SR, wherein the first PUCCH resource is different from the second PUCCH resource; the first SR corresponds to a first Transmission Time Interval (TTI) length, the second SR corresponds to a second TTI length, and the first TTI length is different from the second TTI length; and detect whether the first SR and/or the second SR transmitted by the terminal is received in one or more transmission occasions of the first SR and/or the second SR, wherein the one or more transmission occasions are determined based on a transmission periodicity and/or an offset of a corresponding SR, and the corresponding SR is the first SR or the second SR;

wherein when the first SR and the second SR are to be transmitted by the terminal, the processor is further configured to read and execute the programs in the memory to detect whether the first SR and/or second SR transmitted by the terminal by one of following schemes:

scheme 1: detecting the first SR on the first PUCCH resource, or detecting the second SR on the second PUCCH resource;

scheme 2: detecting the second SR on the second PUCCH resource; or scheme 3: detecting the first SR on the first PUCCH resource, and detecting the second SR on the second PUCCH resource; wherein the processor is further configured to read and execute the programs in the memory to detect whether the first SR and/or second SR transmitted by the terminal by:

detecting the first SR in a PUCCH corresponding to the second TTI length, and detecting the second SR in a PUCCH corresponding to the second TTI length; or detecting the first SR in a PUCCH corresponding to the first TTI length, and detecting the second SR in a PUCCH corresponding to the second TTI length;

wherein the processor is further configured to read and execute the programs in the memory to detect the first SR in the PUCCH corresponding to the second TTI length by:

detecting the first SR in the PUCCH corresponding to the second TTI length at a predefined or preconfigured time domain position in a transmission occasion of the first SR.

14. The device according to claim 13, wherein the second TTI length is less than the first TTI length.

15. The device according to claim 13, wherein the processor is further configured to read and execute the programs in the memory to detect whether the first SR and/or second SR transmitted by the terminal is received by:

detecting the first SR on the first PUCCH resource in a transmission occasion of the first SR; and/or detecting the second SR on the second PUCCH resource in a transmission occasion of the second SR.

16. The network-side device according to claim 13, wherein the first SR corresponds to a first service transmitted using the first TTI length, and the second SR corresponds to a second service transmitted using the second TTI length; or the first SR corresponds to a first service, the second SR corresponds to a second service, and service attributes of the first service and the second service are different; or a transmission periodicity and/or an offset of the first SR is configured based upon the first TTI length, and a transmission periodicity and/or an offset of the second SR is configured based upon the second TTI length.

* * * * *